United States Patent
Koskey

(10) Patent No.: US 10,227,051 B2
(45) Date of Patent: Mar. 12, 2019

(54) CARGO LINER FOR ENCLOSED PET BED

(71) Applicant: James Donald Koskey, Manitou Springs, CO (US)

(72) Inventor: James Donald Koskey, Manitou Springs, CO (US)

(73) Assignee: K&H Manufacturing, LLC, Colorado Springs, CO (US)

( * ) Notice: Subject to any disclaimer, the term of this patent is extended or adjusted under 35 U.S.C. 154(b) by 19 days.

(21) Appl. No.: 14/547,876

(22) Filed: Nov. 19, 2014

(65) Prior Publication Data

US 2018/0065572 A1  Mar. 8, 2018

(51) Int. Cl.
*B60R 13/01* (2006.01)

(52) U.S. Cl.
CPC ....... *B60R 13/011* (2013.01); *B60R 2013/016* (2013.01)

(58) Field of Classification Search
CPC .................. B60R 13/011; B60R 2013/016
See application file for complete search history.

(56) References Cited

U.S. PATENT DOCUMENTS

| 8,430,441 B2 * | 4/2013 | Waterman | ............... B60R 13/01 296/136.01 |
| 2006/0170237 A1 * | 8/2006 | McAuliffe, Jr. | ...... B60R 13/011 296/39.1 |

FOREIGN PATENT DOCUMENTS

CA    2493051 A1 *  6/2005   ............... B60R 5/04

* cited by examiner

*Primary Examiner* — D Glenn Dayoan
*Assistant Examiner* — Melissa A Black
(74) *Attorney, Agent, or Firm* — Ice Miller LLP

(57) ABSTRACT

A cargo liner for an enclosed vehicle has a water proof flexible material with a central section and a pair of butterfly wings. A number of first attachment points are space along an edge of one of the pair of butterfly wings. A pair of straps is located on a first edge of the central section. A number of adjustable straps each have a second attachment point at a first end of the adjustable straps. A number of suction cups are attached to the adjustable straps. The cargo liner is easily installed, is inexpensive to ship because it can fold down to a small package, and is adjustable to fit a wide variety of vehicles.

7 Claims, 4 Drawing Sheets

`US 10,227,051 B2`

CARGO LINER FOR ENCLOSED PET BED

RELATED APPLICATIONS

None.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Sports Utility Vehicles (SUVs) have become popular however people often want to carry cargo, such as dogs, landscaping materials, wood, that are dirty and will get the carpeted cargo area dirty. There have been a number of proposed solutions to this problem, including an extra carpeting layer backed by rubber to cover the floor of the cargo area that is removable. However, the extra carpeting layer does not protect the sides of the cargo area. Another solution has been semi-rigid liners, including ones that provide some protection for the sides of the cargo area and the back of the back seat. However, these only fit one model of vehicle and are expensive to ship. There have been attempts to produce flexible liners for enclosed vehicles. The advantage of flexible liners is that they are somewhat adjustable so they can fit a variety of vehicles and they are much less expensive to ship. The down side to most flexible liners is that the sides tend to fall over. One solution has been to use hook and loop material on the underside of the liner and attach the sides to the carpeting on the interior of the vehicle, but not all vehicles have cargo side walls that are carpeted. This can be overcome by using an adhesive strip to hold one side of the hook and loop material to the side of the cargo area, but adhesives tend to release in the extreme temperatures and solar loading of a vehicle cargo area. One proposed solution includes a complex system of cords that creates multi-triangular suspension. This suspension system is held up by the installed clothes hooks or by suction cups attached to the windows. This system is extremely complex to install and only fits one model of vehicle or at most a very limited number of models.

Thus there exists a need for a cargo liner for an enclosed vehicle that is inexpensive to ship, fits a wide variety of models of vehicles, and is easy to install.

BRIEF SUMMARY OF INVENTION

A cargo liner for an enclosed vehicle that overcomes these and other problems has a water proof flexible material with a central section and a pair of butterfly wings. A number of first attachment points are space along an edge of one of the pair of butterfly wings. A pair of straps is located on a first edge of the central section. A number of adjustable straps each have a second attachment point at a first end of the adjustable straps. A number of suction cups are attached to the adjustable straps. The cargo liner is easily installed by placing the pair of straps over the head rests of the back seat. The central section is smoothed to conform to the back seat. Hook and loop strips may be used to hold the central section of the liner to the back of the back seat. The tips of the butterfly wings are folded over to adjust for the width of the vehicle. They attach to the central section against the backseat by hook and loop strips. The top or outer edges of the butterfly wings have a number of snaps. The owner selects the best position to hold the edges up, snaps a flexible cord to the butterfly, and then attaches a suction cup on the window. This process is repeated for two or more locations on both sides of the cargo area, to hold the butterfly wings in an essentially vertical position.

The butterfly wings allow the cargo liner to fit multiple models of vehicles. The suction cups and multiple snap locations also allow the cargo liner to fit multiple models of vehicles. The cargo liner is easy to install and because it is flexible it is inexpensive to ship.

DETAILED DESCRIPTION OF THE INVENTION

A cargo liner for an enclosed vehicle has a water proof flexible material with a central section and a pair of butterfly wings. A number of first attachment points are space along an edge of one of the pair of butterfly wings. A pair of straps is located on a first edge of the central section. A number of adjustable straps each have a second attachment point at a first end of the adjustable straps. A number of suction cups are attached to the adjustable straps. The cargo liner is easily installed by placing the pair of straps over the head rests of the back seat. The central section is smoothed to conform to the back seat. Hook and loop strips may be used to hold the central section of the liner to the back of the back seat. The tips of the butterfly wings are folded over to adjust for the width of the vehicle. They attach to the central section against the backseat by hook and loop strips. The top or outer edges of the butterfly wings have a number of snaps. The owner selects the best position to hold the edges up snaps a flexible cord to the butterfly wing and then attaches a suction cup on the window. This process is repeated for two or more locations on both sides of the cargo area, to hold the butterfly wings in an essentially vertical position.

The butterfly wings allow the cargo liner to fit multiple models of vehicles. The suction cups and multiple snap locations also allow the cargo liner to fit multiple models of vehicles. The cargo liner is easy to install and because it is flexible it is inexpensive to ship.

Figure 1:
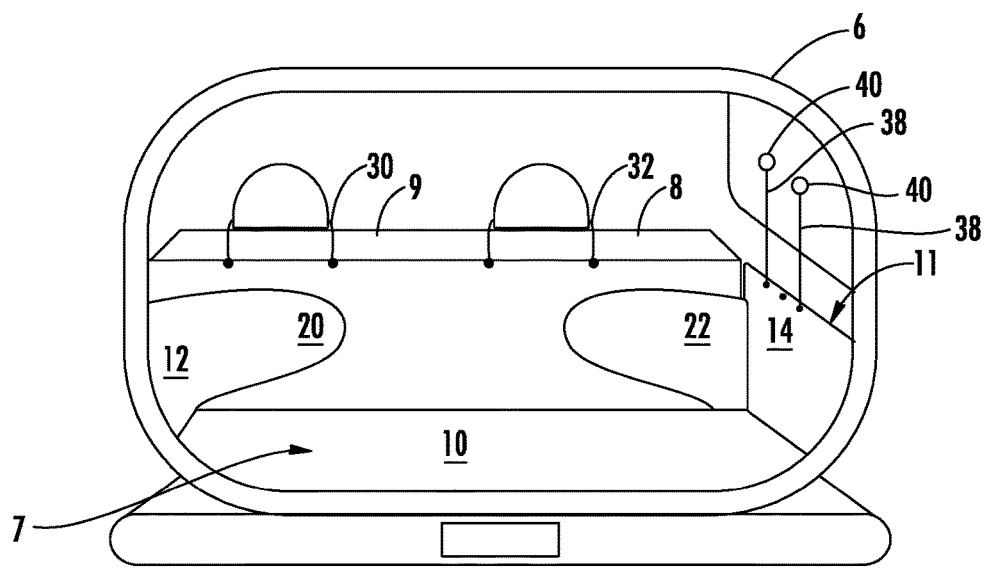
FIG. 1 is a perspective view of cargo area of an enclosed vehicle with a cargo liner in accordance with one embodiment of the invention.

FIG. 1 is a perspective view of cargo area of an enclosed vehicle 6 with a cargo liner 7 in accordance with one embodiment of the invention. The cargo liner 7 has a central section 10 that covers the floor of the cargo area and runs up the back 8 of a backseat 9 of the vehicle 6. A pair of straps 30, 32 fit around a pair of headrests on the backseat 9 and hold the central section 10 to the backseat 9. The butterfly wings 12, 14 protect the sides of the cargo area 11 and tips 20, 22 that overlap the central section 10 along the backseat 9. The sides of the butterfly wings 12, 14 have a plurality of snaps 34 (best seen in FIG. 2) that attach to straps 38 that are connected to suction cups 40. The suction cups 40 attach to the window and this system holds up the sides (butterfly wings) along the sides of the cargo area.

Figure 2:
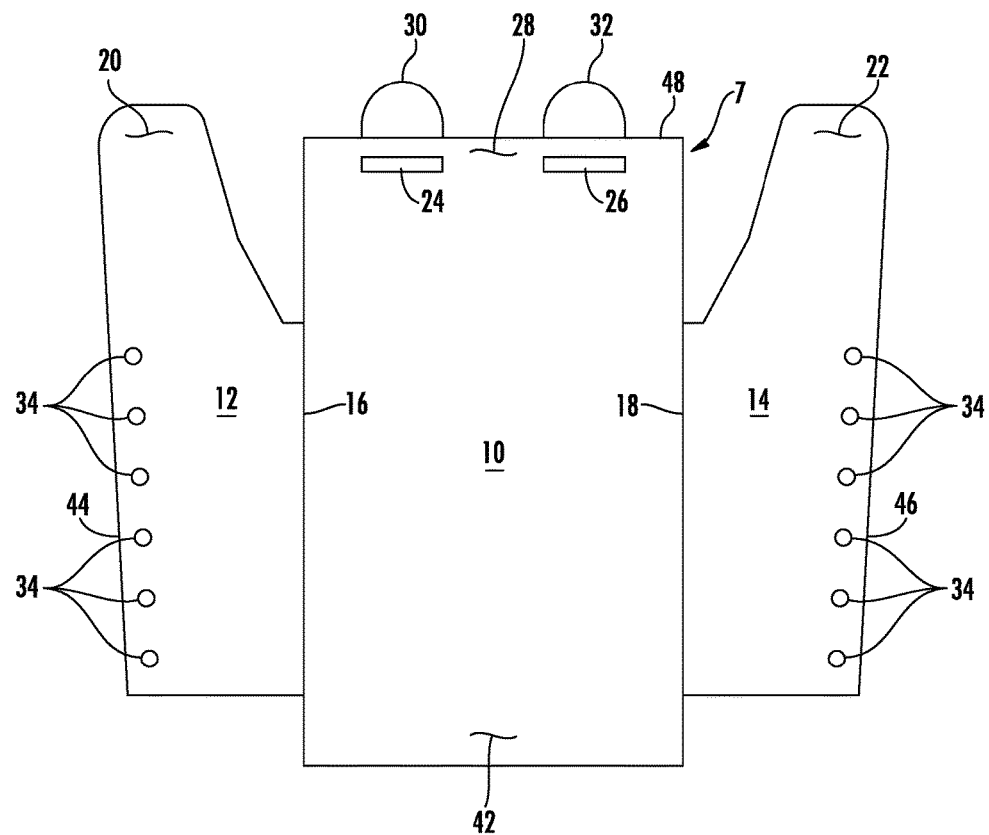
FIG. 2 is a top view of a cargo liner in accordance with one embodiment of the invention.

FIG. 2 is a top view of a cargo liner 7 in accordance with one embodiment of the invention. The cargo liner 7 has a central section 10 with a pair of butterfly wings (side wings) 12, 14. The cargo liner 7 is made of a water proof material. In one embodiment, it is a fabric with a water proof layer on the top side. The butterfly wings 12, 14 have tips or flaps 20, 22. The pair of butterfly wings 12, 14 are attached to the long edges 16, 18, which are sewn to the central section 10 in one embodiment. The butterfly wings 12, 14 have outer edges 44, 46 along which are a number of attachment points 34. In one embodiment, the attachment points are snaps. One of the short edges 48 of the central section 10 has a pair of straps 30, 32. In one embodiment the straps 30, 32 are elastic. Adjacent to the one short edge 48 are a pair of connection strips 24, 26. In one embodiment, the connection strips 24, 26 are one part of a hook and loop fastener.

Figure 3:
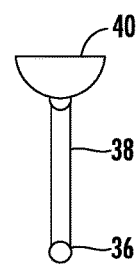
FIG. 3 is a side view of a suction cup and strap in accordance with one embodiment of the invention.

FIG. 3 is a side view of a suction cup 40 and strap 38 in accordance with one embodiment of the invention. The strap 38 has a connector 36 that mates with the connection points 34 and in one embodiment is a snap. The strap 38 may be adjustable or may be elastic or both.

Figure 4:
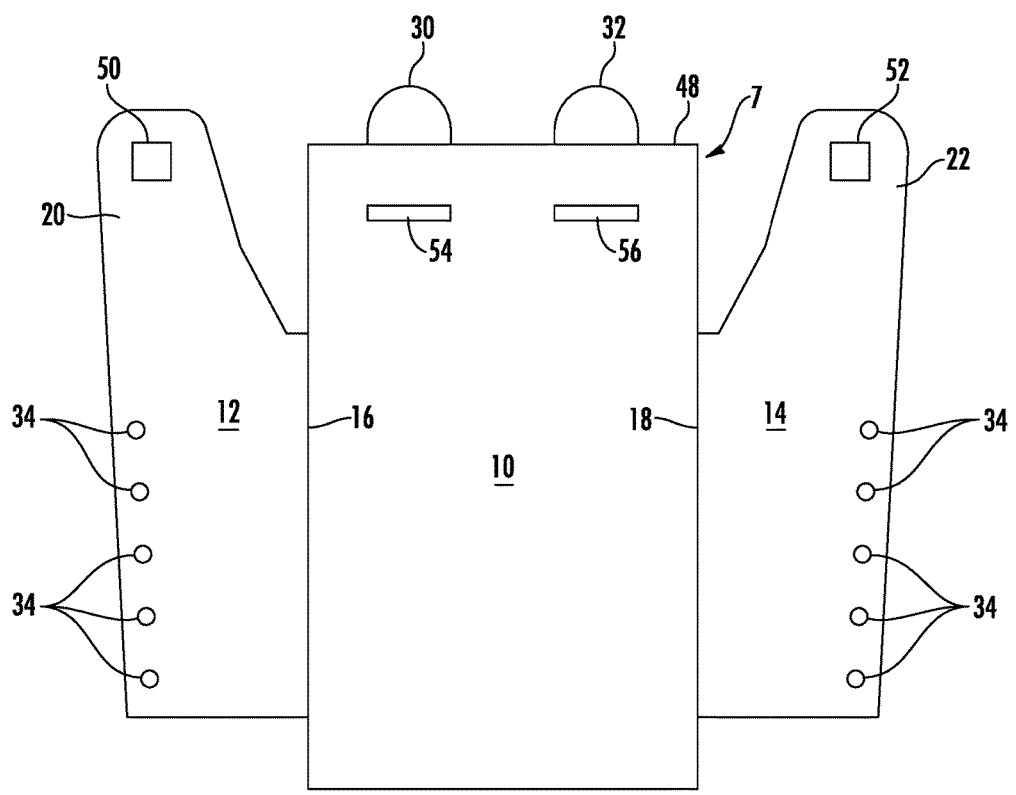
FIG. 4 is a bottom view of a cargo liner in accordance with one embodiment of the invention.

FIG. 4 is a bottom view of a cargo liner 7 in accordance with one embodiment of the invention. The bottom view is similar to the top view shown in FIG. 2 but includes a pair of connection strips 50, 52, which are the mating hook and loop fasteners for the strips 24, 26 of FIG. 2. In one embodiment, the back side may include one or more strip fasteners 54, 56 that are hook and loop fasteners that attach to the carpet on the back 8 of the backseat 9 of the vehicle.

Figure 5:
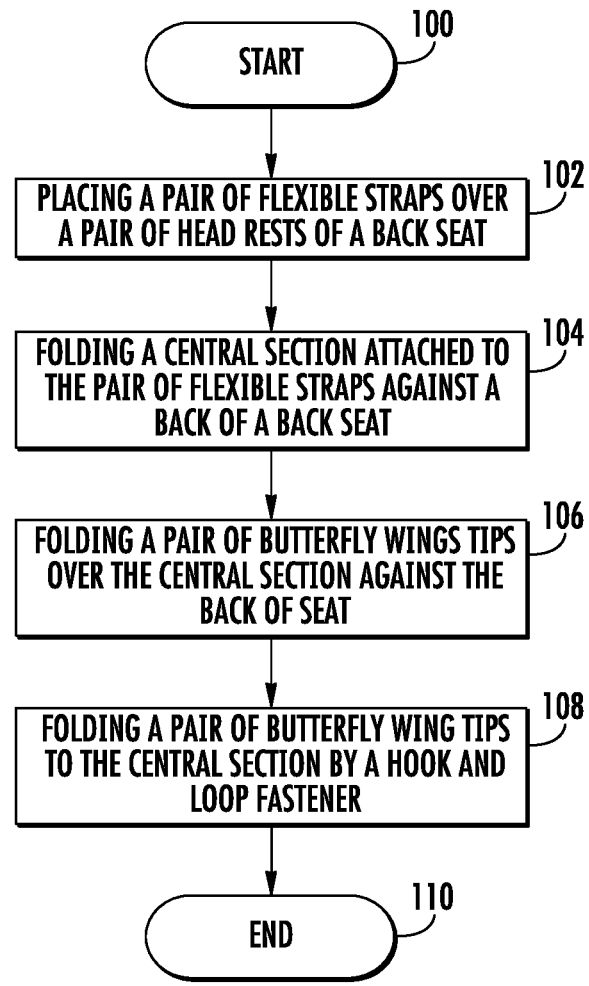
FIG. 5 is a flow chart of the steps used in installing a cargo liner in accordance with one embodiment of the invention.

FIG. 5 is a flow chart of the steps used in installing a cargo liner in accordance with one embodiment of the invention. The process starts, step 100, by placing the pair of flexible straps over the head rests on the backseat at step 102. Next, the central section is folding against the backseat at step 104. The pair of butterfly wing tips is folded over against the central section that is against the backset at step 106. At step 108, the pair of butterfly wing tips is attached to the central section by hook and loop fasteners, which ends the process at step 110.

Thus there has been described a cargo liner for an enclosed vehicle that is inexpensive to ship, fits a wide variety of models of vehicles, and is easy to install.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A cargo liner for an enclosed vehicle, comprising:
a water proof flexible material having a central section and a pair of side wings comprising a flap;
a pair of connection strips on the water proof flexible material adjacent to the first edge of the central section;
a plurality of first attachment points along an edge of one of the pair of side wings;
a pair of straps on a first edge of the central section;
a plurality of adjustable straps each having a second attachment point at a first end of the plurality of adjustable straps; and
a plurality of suction cups each attached to one of the plurality of adjustable straps; and
a mating pair of connection strips on a back side of the flaps of the pair of side wings that engage the pair of connection strips on the water proof flexible material adjacent to the first edge of the central section.

2. The cargo liner of claim 1, wherein the plurality of first attachment points are snaps.

3. The cargo liner of claim 1, wherein the pair of connection strips are one part of a hook and loop fastener.

4. The cargo liner of claim 1, further including a plurality of hook strips on a back side of the pair of side wings.

5. A method of installing a cargo liner for an enclosed vehicle, comprising the steps of
placing a pair of flexible straps over a pair of head rests of a back seat; folding a central section attached to the pair of flexible straps against a back of a back seat;
folding a pair of butterfly wings tips over the central section against the back of seat; and
attaching the pair of butterfly wing tips to the central section by a hook and loop fastener.

6. The method of claim 5, further including the step of:
selecting a snap location on a first of the pair of butterfly wings and snapping a strap to the snap location and then applying a suction cup to a window so that the first of the pair of butterfly wings is held in a roughly vertical position.

7. The method of claim 6, further including the step of:
selecting a second snap location on a second of the pair of butterfly wings and snapping a second strap to the second snap location and then applying a second suction cup to a window so that the second of the pair of butterfly wings is held in a roughly vertical position.

* * * * *